(12) United States Patent
Tomei et al.

(10) Patent No.: US 12,164,924 B2
(45) Date of Patent: Dec. 10, 2024

(54) COMPRESSION METADATA ASSISTED COMPUTATION

(71) Applicant: Advanced Micro Devices, Inc., Santa Clara, CA (US)

(72) Inventors: Matthew Tomei, Itasca, IL (US); Shomit Das, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/033,308

(22) Filed: Sep. 25, 2020

(65) Prior Publication Data

US 2022/0100518 A1    Mar. 31, 2022

(51) Int. Cl.
*G06F 9/30*     (2018.01)
*G06F 12/0875*  (2016.01)

(52) U.S. Cl.
CPC ...... *G06F 9/30181* (2013.01); *G06F 9/30043* (2013.01); *G06F 12/0875* (2013.01); *G06F 2212/452* (2013.01)

(58) Field of Classification Search
CPC .................................................. G06F 9/30181
See application file for complete search history.

(56) References Cited

U.S. PATENT DOCUMENTS

| 6,202,204 B1 * | 3/2001 | Wu ......................... G06F 8/433 |
| | | 712/E9.047 |
| 2001/0032306 A1 * | 10/2001 | Duesterwald ....... G06F 11/3471 |
| | | 712/216 |
| 2009/0049282 A1 * | 2/2009 | Bacon ................. G06F 9/30043 |
| | | 711/E12.017 |
| 2010/0161948 A1 * | 6/2010 | Abdallah .............. G06F 9/3853 |
| | | 712/228 |
| 2014/0108731 A1 * | 4/2014 | Sardashti ............ G06F 12/0223 |
| | | 711/E12.024 |
| 2016/0291981 A1 * | 10/2016 | Robatmili ............. G06F 9/3857 |
| 2017/0287101 A1 * | 10/2017 | Flordal ................. G06F 3/0673 |
| 2018/0181337 A1 * | 6/2018 | Durham ................ G06F 21/79 |
| 2019/0026044 A1 * | 1/2019 | Grube ................... G06F 3/0619 |
| 2019/0042108 A1 | 2/2019 | Doshi et al. |
| 2020/0104262 A1 | 4/2020 | Das et al. |
| 2020/0133866 A1 | 4/2020 | Das et al. |
| 2020/0167076 A1 * | 5/2020 | Lai ........................ G06F 3/0655 |

(Continued)

FOREIGN PATENT DOCUMENTS

JP    2020086477 A    6/2020

OTHER PUBLICATIONS

A. Arelakis and P. Stenstrom, "SC2: A statistical compression cache scheme," in ACM SIGARCH Computer Architecture News, 2014, vol. 42, pp. 145-156.

(Continued)

*Primary Examiner* — Michael J Metzger
(74) *Attorney, Agent, or Firm* — FIG. 1 Patents (57) ABSTRACT

A method includes, in response to receiving an instruction to perform a first operation on first data stored in a memory device, obtaining first compression metadata from the memory device based on an address for the first data, and reducing a number of operations in a set of operations based on the first operation and one or more matching addresses, the one or more matching addresses corresponding to second compression metadata matching the first compression metadata.

20 Claims, 5 Drawing Sheets

(56) References Cited

U.S. PATENT DOCUMENTS

2020/0201645 A1* 6/2020 Mekkat ................ G06F 9/3842
2020/0364055 A1* 11/2020 Al Sheikh ............. G06F 9/3838

OTHER PUBLICATIONS

A. Arelakis, F. Dahlgren, and P. Stenstrom, "HyComp: A hybrid cache compression method for selection of data-type-specific compression methods," in 2015 48th Annual IEEE/ACM International Symposium on Microarchitecture (MICRO), 2015, pp. 38-49.

D. Brooks and M. Martonosi, "Value-based Clock Gating and Operation Packing: Dynamic Strategies for Improving Processor Power and Performance," ACM Trans. Comput. Syst., vol. 18, No. 2, pp. 89-126, May 2000.

G. H. Loh, "Exploiting data-width locality to increase superscalar execution bandwidth," in 35th Annual IEEE/ACM International Symposium on Microarchitecture, 2002. (MICRO-35). Proceedings., 2002, pp. 395-405.

G. Pekhimenko, V. Seshadri, O. Mutlu, P. B. Gibbons, M. A. Kozuch, and T. C. Mowry, "Base-delta-immediate compression: Practical data compression for on-chip caches," in Proceedings of the 21st international conference on Parallel architectures and compilation techniques, 2012, pp. 377-388.

J. Kim, M. Sullivan, E. Choukse, and M. Erez, "Bit-plane Compression: Transforming Data for Better Compression in Many-core Architectures," in Proceedings of the 43rd International Symposium on Computer Architecture, Piscataway, NJ, USA, 2016, pp. 329-340.

J. S. Miguel, M. Badr, and N. E. Jerger, "Load Value Approximation," in Proceedings of the 47th Annual IEEE/ACM International Symposium on Microarchitecture, Washington, DC, USA, 2014, pp. 127-139.

Perais and A. Seznec, "BeBOP: A cost effective predictor infrastructure for superscalar value prediction," in 2015 IEEE 21st International Symposium on High Performance Computer Architecture (HPCA), 2015, pp. 13-25.

Perais, F. A. Endo, and A. Seznec, "Register Sharing for Equality Prediction," in The 49th Annual IEEE/ACM International Symposium on Microarchitecture, Piscataway, NJ, USA, 2016, p. 4:1-4:12.

Xi Chen, Lei Yang, R. P. Dick, Li Shang, and H. Lekatsas, "C-Pack: A High-Performance Microprocessor Cache Compression Algorithm," IEEE Transactions on Very Large Scale Integration (VLSI) Systems, vol. 18, No. 8, pp. 1196-1208, Aug. 2010.

Hwang Y S et al: "On reducing load/store latencies of cache accesses", Journal of Systems Architecture. Elsevier BV, NL, vol. 56, No. 1, Jan. 1, 2010 (Jan. 1, 2020), pp. 1-15, XP026826583, ISSN: 1383-7621 [retrieved on Oct. 22, 2009].

International Search Report and Written Opinion, Application No. PCT/US2021/050971 dated Nov. 29, 2021.

PCT/US2021/050971 , "International Preliminary Report on Patentability", PCT Application No. PCT/US2021/050971, Apr. 6, 2023, 8 pages.

2023-519089, "Foreign Office Action", JP Application 2023-519089, Jun. 4, 2024, 9 pages.

* cited by examiner

COMPRESSION METADATA ASSISTED COMPUTATION

BACKGROUND

Most modern computing devices provide at least one level of cache memory (or "cache") in addition to a main memory in the computing device. Generally, caches are smaller-capacity, faster-access memories that are used for storing a limited number of copies of data and instructions to be used for performing various operations (e.g., computational operations, etc.) nearer to the functional blocks in the computing device that perform the operations. Caches are typically implemented using higher-speed memory circuits, such as static random access memory (SRAM) integrated circuits and other types of memory circuits. Compression of data in a cache allows a greater amount of data to be accessed with low latency, thus additionally increasing the overall performance of the computing system.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Compression of data stored in a cache effectively increases the capacity of the cache and the link bandwidth to and from the cache. In one embodiment, a process for compressing data into a cache generates compression metadata associated with the compressed data. The compression metadata contains information indicating which values in the compressed data block are similar or identical to each other, and which values match a constant value from some small set (e.g., 0 or −1).

In one embodiment, cache compression metadata serves as a basis for deduplication of redundant operations, such as register loads and arithmetic operations, when the compression metadata indicates that the data values involved in the operations are identical. The computational cost of identifying similar or identical data values has already been incurred by the compression mechanism; therefore, the deduplication is performed with little additional computational cost by comparing existing compression metadata values associated with different addresses. Once a set of identical values have been identified, redundant operations involving the identical values are removed, and operations dependent on the removed operations are updated to depend from a remaining equivalent operation. The removal of redundant operations reduces the number of computations and/or load operations performed. This reduces pressure in the arithmetic logic unit (ALU) and physical register file, effectively increasing link bandwidth, and ultimately resulting in increased throughput and decreased power consumption.

Figure 1:
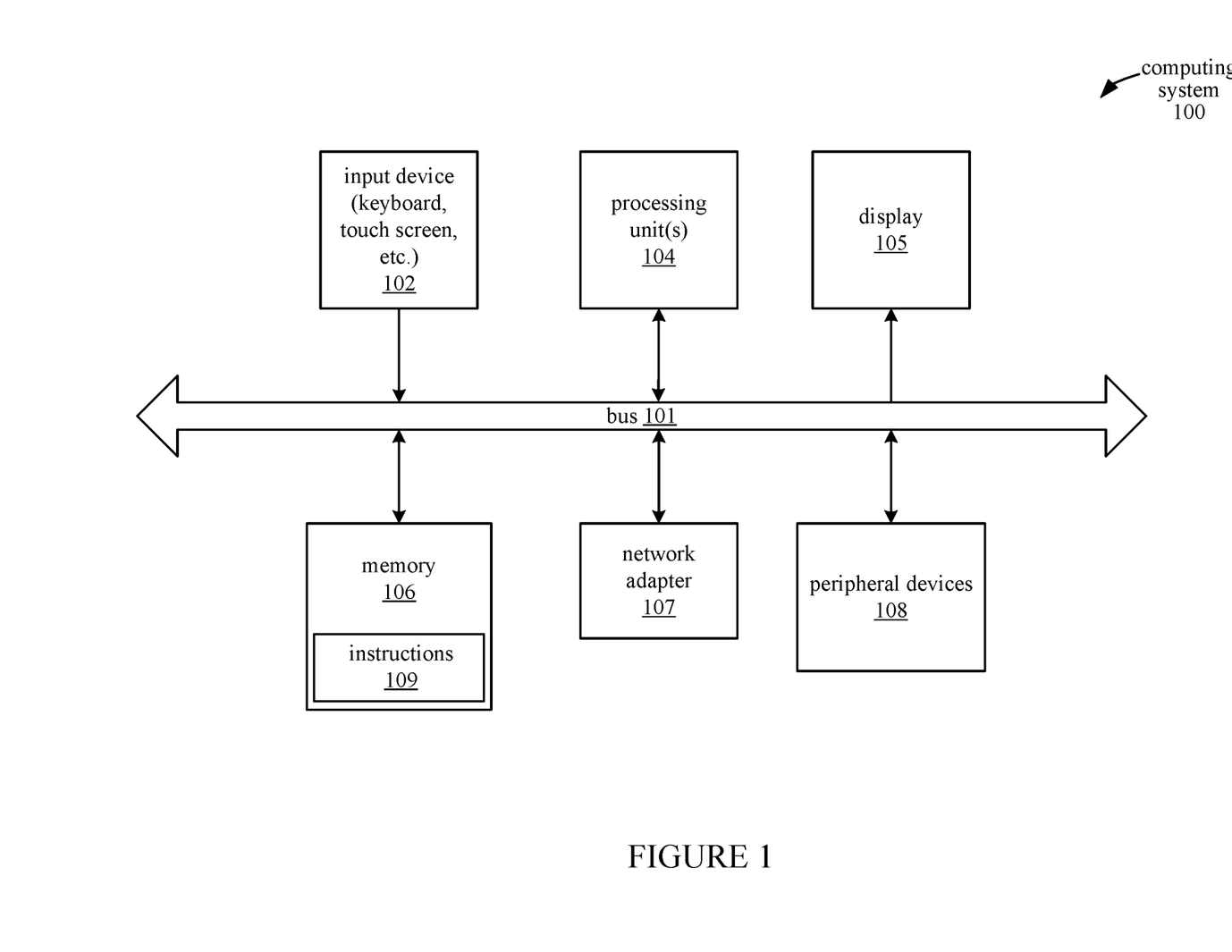
FIG. 1 illustrates an embodiment of a computing device.

FIG. 1 illustrates an embodiment of a computing system 100 in which the above compression metadata assisted computation mechanism is implemented. In general, the computing system 100 is embodied as any of a number of different types of devices, including but not limited to a laptop or desktop computer, mobile device, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes one or more processing units 104, which in the case of multiple processing units 104 are capable of operating in parallel. The processing units 104 are configured to receive and execute instructions 109 that are stored in the memory subsystem 106. In one embodiment, each of the processing units 104 includes multiple computing nodes that reside on a common integrated circuit substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple buses 101, network adapters 107, memory devices 106, etc.

Figure 2A:
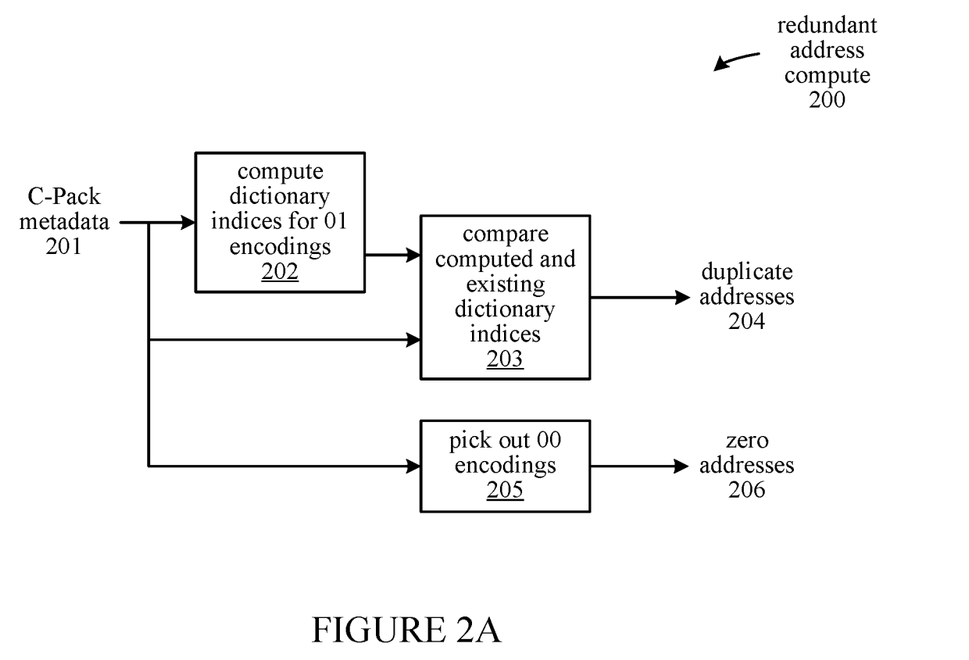
FIGS. 2A and 2B illustrate embodiments of redundant address compute units.
Figure 2B:
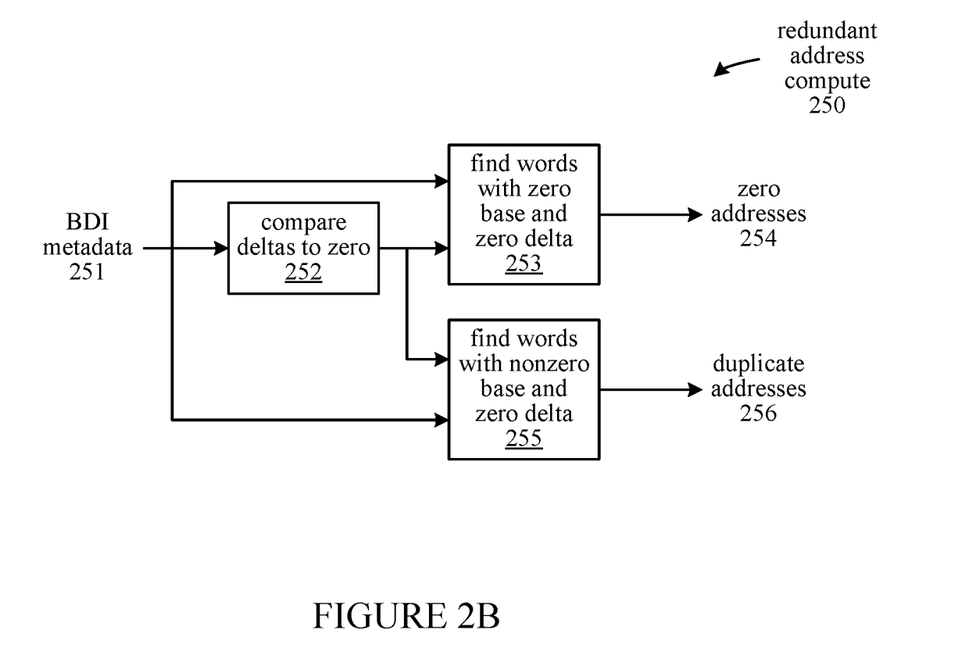

The block diagrams in FIGS. 2A and 2B illustrate the functions of redundant address compute logic 200 and 250, according to an embodiment. The redundant address compute logic units 200 and 250 compute the addresses associated with redundant operations as indicated by two exemplary types of compression metadata, C-Pack and Base-Delta-Immediate (BDI), which are cache compression schemes implemented in the computing system 100. Aside from the C-Pack and BDI compression schemes discussed herein, other compression schemes are used in alternative embodiments, where such compression schemes provide compression metadata indicating which compressed data values are similar or identical.

The C-Pack compression scheme represents data in the cache using compact encodings to replace frequently appearing data words. Words frequently appearing in the data being compressed are stored in a dictionary. Universally common data words (e.g., all zeros), are encoded using a single compact code without explicitly storing the value in the dictionary; thus, no dictionary lookup is used to decode these values. For other values, the C-Pack compression scheme represents the value in the cache using a compact encoding and a pointer to an entry in the dictionary that contains the complete word. Thus, memory capacity is conserved when multiple identical data words are represented in the cache using a compact reference to the same data word in the dictionary. In addition, partially matching words can be represented in the cache using a reference the matching portion of a word stored in the dictionary, or multiple portions of different words in the dictionary.

Accordingly, similarities between data words in the cache are encoded in the metadata (including codes and pointers) used to represent the data words. In particular, identical codes and pointers refer to the same constant or dictionary entry, and therefore encode the same value. The similarity is determined by comparing the metadata values without accessing the actual value in the dictionary.

With reference to FIG. 2A, the redundant address compute logic 200 receives the C-Pack metadata 201, which includes codes and pointers, and compares the metadata values to identify duplicate addresses 204 (i.e., addresses storing duplicate values) and zero addresses 206 (i.e., addresses storing zeros). In one embodiment, the C-Pack metadata 201 includes a code for each 4-byte value, and the compute logic 200 identifies addresses 204 and 206 based on three of the possible codes: '00', '01', and '10'. The code '00' indicates that the value at the corresponding address is zero. Code '01' indicates that the dictionary index for the 4-byte value is computed based on the number of '10' codes appearing previously, which is calculated in block 202. Code '10' indicates that the index is contained directly in the metadata.

When the indices for the '01' codes have been calculated in block 202, they are compared with the explicitly included indices corresponding to the '10' codes at block 203. The set of duplicate addresses 204 are the addresses corresponding to the matching indices found by block 203. Block 205 identifies addresses associated with the '00' encodings in the metadata 201; these addresses contain the value zero.

Codes other than '00', '01', and '10' indicate that the represented value partially matches one or more values in the dictionary; thus, a dictionary lookup would be performed to identify matching values. Since a dictionary lookup incurs a similar performance penalty as a normal cache access, these codes are ignored by the compute logic 200.

A data block stored according to the BDI compression scheme includes a base value and a series of delta values each representing a word in the original data block. Each delta value is also associated with a value indicating whether the base for the delta is zero or the recorded base value. With reference to FIG. 2B, the redundant address compute logic 250 identifies the zero addresses 254 (i.e., addresses storing a value of zero) by finding the delta values having a value of zero at block 252, then comparing the resulting set with deltas having a base of zero at block 253. The resulting zero addresses 254 have a delta of zero relative to a base of zero, and therefore have a value of zero.

In block 255, the deltas having a zero delta and the non-zero base are identified; these addresses 256 have a delta of zero relative to the same base and therefore contain matching values. In one embodiment, a similar computation is performed for delta values other than zero. Addresses having the same delta value relative to the same base value are identified as matching each other. A first value represented by a first delta value and a first base value is equal to a second value represented by a second delta value and a second base value when the first delta value is equal to the second delta value and the first base value is equal to the second base value.

Figure 3:
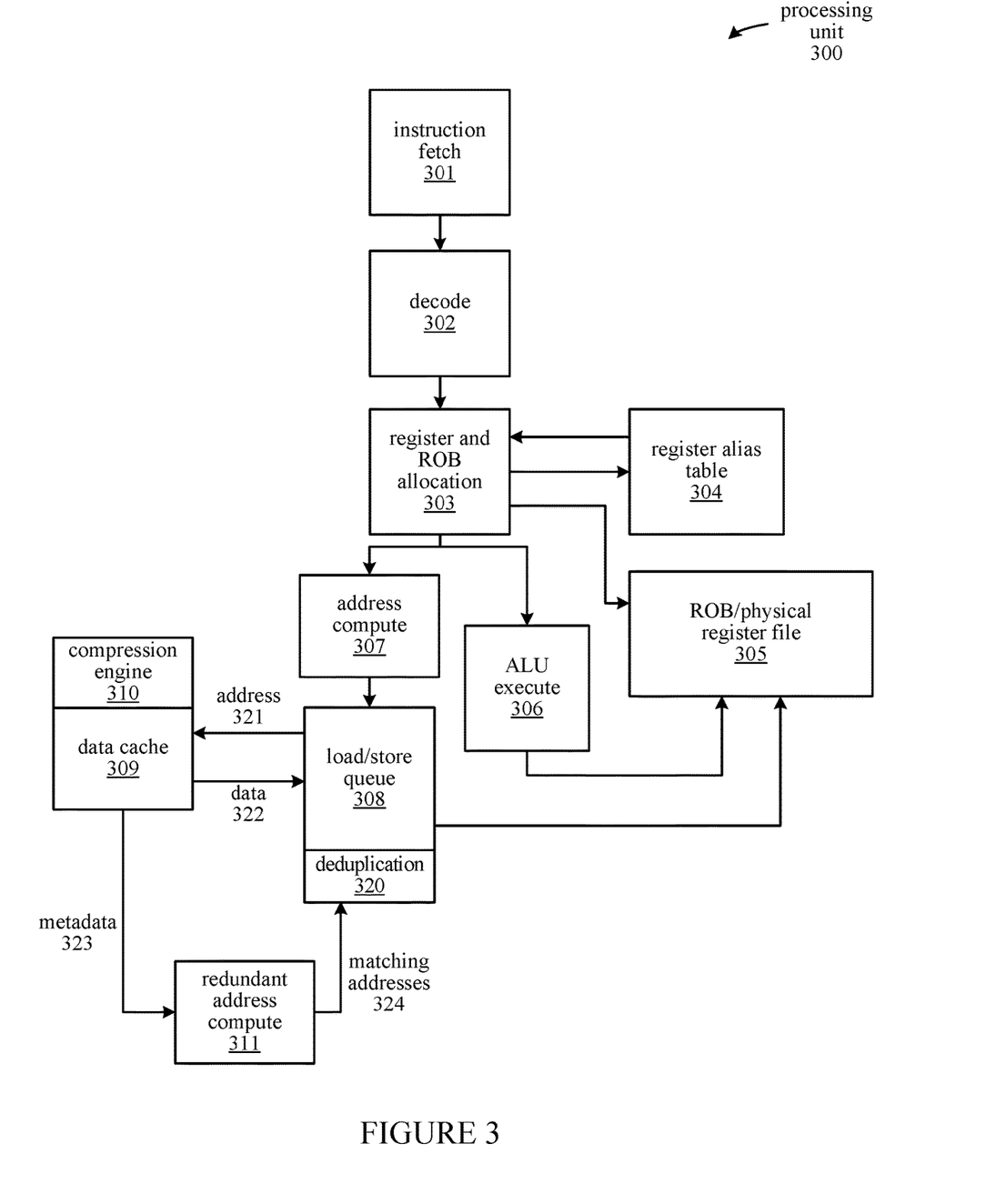
FIG. 3 illustrates components in a processing unit, according to an embodiment.

FIG. 3 illustrates components in an out-of-order execution pipeline of processing unit 300 that utilizes the matching address information (including duplicate and/or constant value addresses such as zero addresses) to reduce the number of redundant data cache accesses performed, according to an embodiment. Processing unit 300 corresponds to the processing unit 104 in the computing system 100. In the illustrated configuration, processing unit 300 reduces the number of data cache accesses by identifying addresses containing duplicate data values. The data is read once from the cache, and is replicated for each of the duplicate addresses.

In the processing unit 300, the instruction fetch unit 301 retrieves instructions (e.g., instructions 109) to be executed. The instructions specify an operation to be performed, along with where to find the data values on which the operation will be performed. The decode unit 302 converts the instructions into signals for performing the operation in the processing circuitry.

The register and re-order buffer (ROB) allocation unit 303 facilitates out-of-order execution of the instructions by allocating registers in the ROB/physical register file 305 for storing the operands and results of the specified operations. The allocation unit 303 also updates the register alias table (RAT) 304 to map logical registers to the physical registers that are allocated in the physical register file 305.

The arithmetic logic unit (ALU) 306 performs logic and arithmetic operations according to the opcodes of the received instructions. For load and store operations, the address is computed in the address compute unit 307 and the operation is queued in the load/store queue 308. The operations in the load/store queue transfer data between the data cache 309 and the physical register file 305.

The data cache 309 is a memory device storing data that is likely to be used by the incoming instructions, and has access to data in the rest of the memory hierarchy (e.g., the main memory 106). Data stored in the data cache 309 is compressed when it is written by the compression engine 310. For each data block to be stored in the cache 309, the compression engine 310 generates compression metadata representing the data, such as compact compression codes, deltas, and/or other metadata values depending on the compression scheme used. The metadata is stored in the data cache 309 instead of the original data. In alternative embodiments, some or all of the compression metadata is stored in another memory device instead of the data cache 309. The compressed cached data is also decompressed by the compression engine 310 when it is read, by reconstructing the original data based on the stored compression metadata.

The load/store queue 308 contains a list of load operations each specifying an address in the data cache 309 from which data is to be retrieved and loaded into a register in the physical register file 305. When a load operation is performed from the queue 308, the address 321 associated with the load operation is provided to the data cache 309. The compression engine 310 decompresses the data 322 stored at the provided address and returns the decompressed data 322 to the load/store queue 308. The load/store queue 308 loads the data 322 into a register in the physical register file 305 as specified by the load operation.

The processing unit 300 includes a redundant address compute unit 311, which receives the compression metadata 323 corresponding to the address 321 being accessed. The compression metadata 323 is provided by the compression engine 310, which reads the compression metadata 323 as part of the decompression process.

In one embodiment the redundant address compute unit 311 receives the compression metadata 323, including metadata for the current load operation in the load/store queue 308, and metadata for one or more addresses associated with other load operations in the queue 308. The redundant address compute unit 311 compares the metadata 323 values to find sets of matching addresses 324, as previously discussed with reference to FIGS. 2A and 2B. Thus, every request to the data cache 309 also results in any matching addresses 324 being returned with the data 322.

Each set of two or more duplicate addresses in the matching addresses 324 represents a set of load operations in which one or more of the operations is redundant. The matching addresses 324 are received by deduplication logic 320 in the load/store queue 308, and the deduplication logic 320 eliminates the redundant load operations. After the load/store queue 308 receives the data 322 from the data cache 309 according to the first arriving load operation in the queue 308, the same data 322 is used for completing the eliminated redundant load operations in the queue 308 without repeatedly accessing the cache 309. The deduplication logic 320 removes the redundant operations from the queue 308; thus, the number of data cache accesses is reduced.

In an alternative embodiment, when a load operation is processed from the queue 308, the metadata 323 associated with the load address is saved. The deduplication logic 320 compares compression metadata retrieved for each load operation processed from the queue 308 with the saved metadata values from preceding load operations. If the compression metadata for a subsequent load operation matches any previously saved metadata, this indicates that the data value for the load was previously retrieved from the cache 309, and a repeated access of the data cache 309 would be redundant. Accordingly, the already retrieved value is used to complete the subsequent load operation instead of retrieving the same value from a different address in the data cache 309.

In either case, the same data obtained from a single data cache access is copied to multiple registers in the physical register file 305 to complete multiple redundant load operations, since the redundant load operations are directed to addresses containing identical data values. In alternative embodiments, the redundant data values are not necessarily identical, but are sufficiently similar for the application being executed. For such applications, data values differing within a certain tolerance are treated as redundant values. Accordingly, such embodiments are implemented with a compression scheme that generates compression metadata indicating the similarity. When using the BDI compression scheme, for example, small delta values below a threshold can be treated as representing redundant values when referring to the same base.

In one embodiment, the matching addresses 324 also includes constant value addresses that are identified as storing constant values, such as the zero addresses 206 and 254 as described in FIGS. 2A and 2B. The deduplication logic 320 eliminates unnecessary cache accesses by causing the load/store queue 308 to use the detected constant values instead of retrieving the values from the data cache 309.

Figure 4:
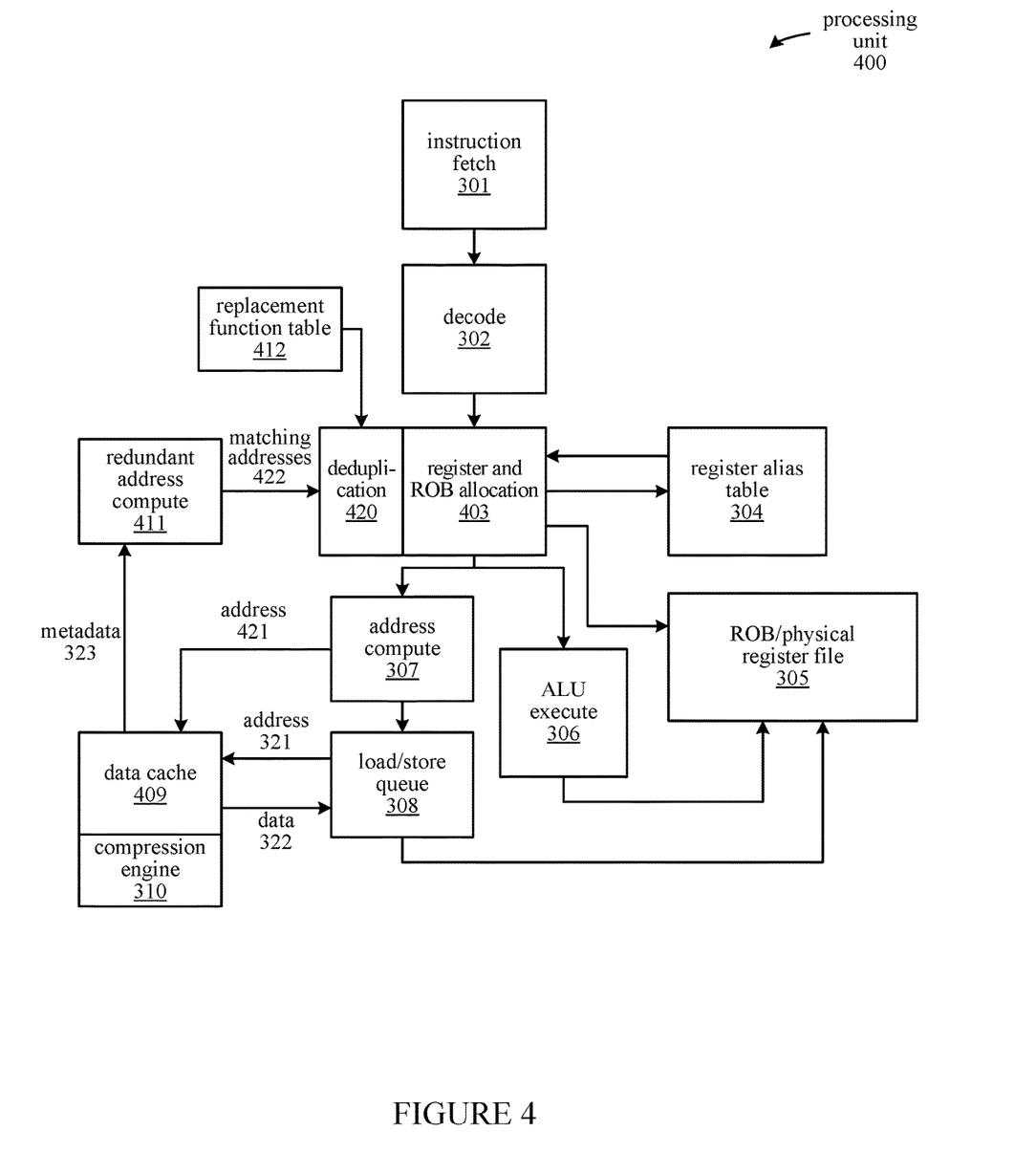
FIG. 4 illustrates components in a processing unit, according to an embodiment.

FIG. 4 illustrates components in an out-of-order execution pipeline of processing unit 400 that utilizes the matching address information to reduce the number of redundant register write and arithmetic operations performed, according to an embodiment. Processing unit 400 corresponds to the processing unit 104 in the computing system 100. In the illustrated configuration, processing unit 400 reduces the number of arithmetic operations executed in the ALU 306 and/or write operations performed in the physical register file 305 by identifying addresses containing duplicate data values based on their associated compression metadata values.

Compared to the processing unit 300, the data cache 409 in the processing unit 400 includes an additional port for receiving the address 421 and providing the metadata 323 as soon as the address 421 is ready instead of waiting to receive the address 321 from the load/store queue 308. The redundant address compute unit 411 determines the matching addresses based on the compression metadata 323, as previously described with reference to FIGS. 2A and 2B. Having determined a set of matching addresses, the redundant address compute unit 411 provides the matching addresses to the deduplication logic 420 in the allocation unit 403.

The matching address information includes duplicate addresses that indicate to the deduplication logic 420 whether two or more load instructions in the pipeline are requesting data from addresses that hold the same value, so that one or more of the load instructions is redundant. The deduplication logic 420 eliminates the redundant load operations by replacing them with a single load operation directed to a single destination register in the ROB/physical register file 305. Other instructions that were dependent on the eliminated load operations have their execution dependencies updated to depend on the remaining single load operation. The deduplication logic 420 also directs the allocation unit 403 to update the RAT 304 so that the aliases originally pointing to the registers associated with the eliminated load operations instead refer to the loaded single physical register in the ROB/physical register file 305. As a result, fewer load operations are performed and the single register is used to store a data value instead of multiple registers to store the same data value. This reduces pressure on the physical register file 305 and the cache 409, thus increasing application performance.

In one embodiment, the deduplication logic 420 additionally deduplicates instructions that become duplicates due to the redundant load operation deduplication. Instructions are identified that depend on the same deduplicated load operation as an operand; any other operands in these instructions also depend on deduplicated load operations or depend on the same physical register. The duplicate instructions are deduplicated in a similar manner as the load operations. All but one of the duplicate instructions are eliminated, resulting in one output register being used for storing the output of the single remaining instruction. Any dependent instructions are updated to depend from the single instruction instead of the multiple duplicate instructions. This instruction deduplication further reduces pressure on the physical register file as well as reducing pressure on the operation execution logic (e.g., ALU 306), which has fewer instructions to execute.

In one embodiment, the compression metadata is used to eliminate unnecessary operations by determining when the data stored at an address matches a particular constant value. As an example, for many instructions (such as multiplication or addition), when one operand is known to be zero, the result is either a constant or a simpler function of the other operand. The deduplication logic 420 identifies these instructions based on information (e.g., zero addresses 206 or 254) received from the redundant address compute unit 411, and replaces the instructions with simpler equivalent operations. The replacement operation is determined based on the original instruction and the constant value, which are associated with an appropriate replacement function in a table 412. For example, the replacement function table indicates that a multiplication instruction will be replaced with an identity function or a zero output if one of its operands is 1 or 0, respectively. The table 412 is located in dedicated memory or, in alternative embodiments, is located in the physical register file 305, cache 409, or other memory device.

Operations originally depending on any eliminated instructions have their dependencies updated to the corresponding equivalent replacement operations. For example, when an addition operation is performed that adds zero to another operand, the result is the other operand. Accordingly, the instruction is removed and dependencies on the removed addition operation are updated to instead depend on the instruction generating the non-zero operand. Similarly, performing a logical AND with zero always results in an output of zero. Accordingly, the logical AND operation is removed and all dependencies on the removed logical AND are replaced with dependence on an immediate zero.

In one embodiment, components of the processing units 300 and 400 are combined. For example, an alternative embodiment of a processing unit includes deduplication logic units 320 and 420 to support multiple mechanisms for deduplicating redundant operations in the pipeline.

Figure 5:
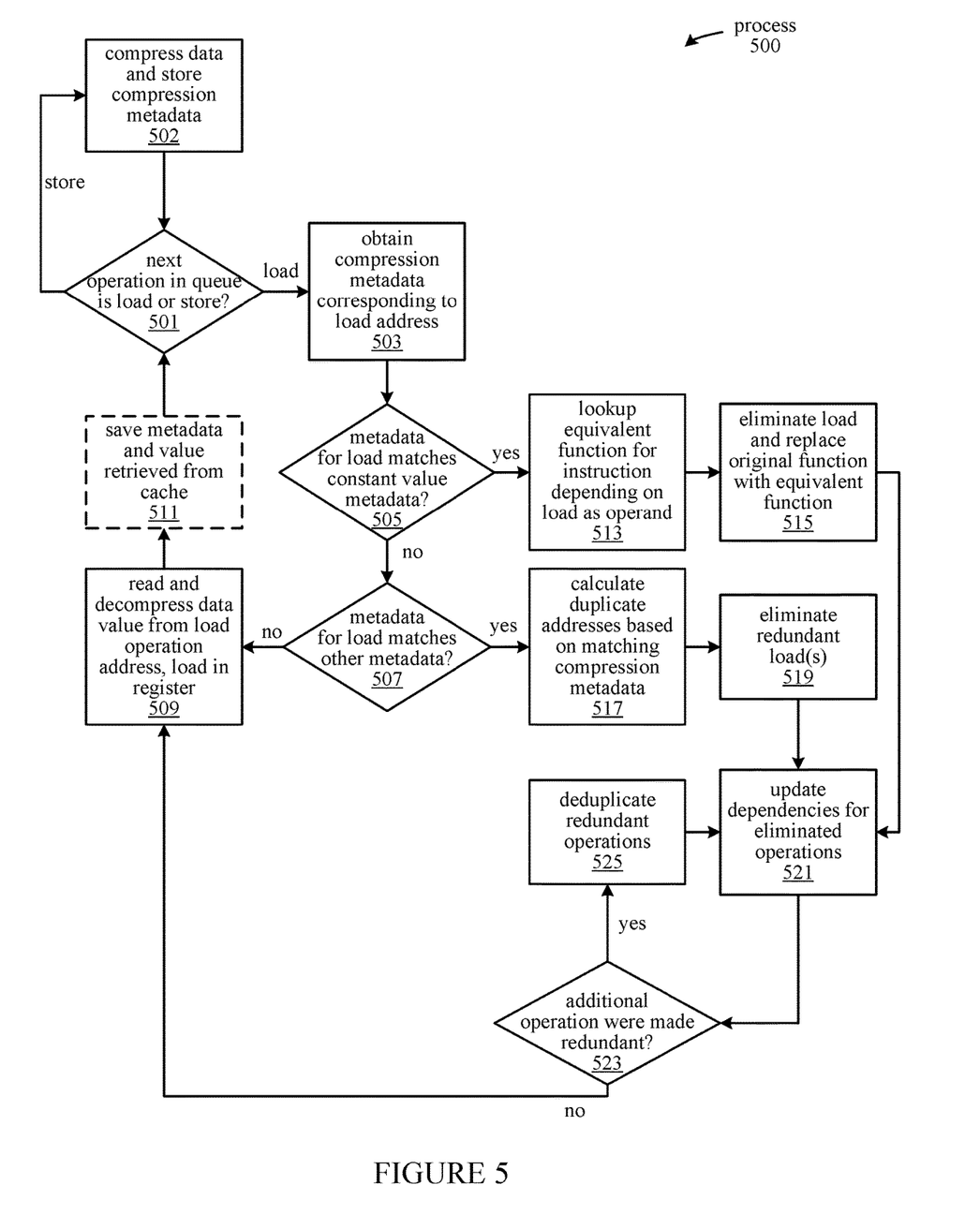
FIG. 5 illustrates a process for performing compression metadata assisted computing, according to an embodiment.

FIG. 5 illustrates a process 500 for eliminating redundant and constant value operations based on compression metadata, according to an embodiment. The process 500 is performed by components of the computing system 100, including the load/store queue 308, data cache 309 or 409, compression engine 310, redundant address compute unit 311 or 411, etc.

The process 500 operates in a processing unit (e.g., processing unit 300 or 400) to perform load and store operations between a data cache (e.g., 309 or 409) and physical registers 305, while eliminating redundant operations (e.g., load and arithmetic instructions) and replacing constant value operations with their simpler equivalent operations. The load/store queue 308 contains a queue of the load and/or store operations, which are processed in sequence. At block 501, if the next operation in the load/store queue 308 is a store operation, the data to be stored is compressed by the compression engine 310 and stored in the data cache, as provided at block 502. For each data value, the compression engine 310 generates associated compression metadata representing the data value. For example, when using the C-Pack compression scheme, the compression engine 310 generates a compact code that refers to one or more dictionary entries or to a frequently used constant value. When using the BDI compression scheme, the compression engine 310 generates a delta value along with an indication of whether the delta is relative to zero or a non-zero base. From block 502, the process 500 returns to block 501 to process the next operation in the load/store queue 308.

At block 501, if the next operation in the load/store queue 308 is a load operation, the process 500 continues at block 503. At block 503, the compression engine 310 reads the compression metadata associated with an address specified by the load instruction from the data cache 409. The compression metadata 323 is provided to the redundant address compute unit 411. From block 503, the process 500 continues at block 505.

At block 505, the compression metadata 323 is compared with compression metadata for known constant values, such as 0 and 1. Depending on the compression scheme used, specific metadata values are generated when such constant values are compressed.

For example, when the C-Pack compression scheme is used, the redundant address compute unit 411 maintains a list containing a predetermined subset of compression codes and their associated constant values (e.g., the constant value 0 is represented by the code '00'). The metadata 323 associated with the specified load address is compared with the code for each of the constant values to determine whether the load address contains that constant value.

When the BDI compression scheme is used, the redundant address compute unit 411 maintains a list containing a predetermined subset of delta and base values and their associated constant values. The metadata 323 values are compared to the known delta and base values for each detectable constant value. For example, a constant 0 is encoded with a delta value of 0 relative to a base of 0; therefore, a delta value of 0 and a base of 0 in the metadata 323 indicate that the address contains a 0 value. If the metadata 323 indicates that the address does not contain one of the constant values, the process 500 continues at block 507.

At block 507, the compression metadata 323 for the address is compared with the compression metadata associated with other addresses. In one embodiment, the compression metadata 323 is compared with compression metadata obtained for preceding load operations. Alternatively, the compression metadata 323 is compared with compression metadata for load operations that are still in the queue 308 that have not yet been executed. In some embodiments, depending on the compression scheme used, compression metadata values are equal when the data values they represent are also equal. In the C-Pack compression scheme, identical values are represented by identical compact codes and, in some cases, a pointer to the same dictionary entry. In the BDI compression scheme, identical values are represented by the same delta value and refer to the same base value. Accordingly, block 507 determines whether the compression metadata 323 is equal to other known compression metadata for other addresses that were previously loaded or have been obtained for load operations still in the queue 308. In one embodiment, the compression metadata comparisons in blocks 505 and 507 are performed in parallel as shown in FIGS. 2A and 2B.

When no duplicate addresses or constant (e.g., zero) addresses are found, the data specified in the load operation is retrieved from the data cache 309 or 409 to be loaded into a register in the physical register file 305. At block 509, the data is read from the cache 309 or 409 and decompressed by the compression engine 310. The decompressed data value is loaded into the destination register specified by the load operation.

In one embodiment, at block 511, the compression metadata 323 for the retrieved data value is stored along with the data value, in case it can be reused later (e.g., at block 507) for a future load operation with matching metadata. From block 511, the process 500 returns to block 501 to continue processing the remaining operations in the load/store queue 308. In an alternative embodiment, the process 500 instead continues from block 509 to block 501 without saving the metadata and retrieved value.

At block 505, if the compression metadata 323 retrieved for the load operation matches the constant value metadata, the process 500 continues at block 513. At block 513, the deduplication logic 420 identifies one or more instructions in the pipeline that depend on the load operation's data value as an operand. For each of these instructions, the deduplication logic 420 performs a lookup in the replacement function table 412 to identify an equivalent replacement function. For example, for an addition instruction with two operands where one operand is determined to be zero based on the compression metadata 323, the replacement function outputs the other operand. In the replacement function table 412, the replacement function is associated with the original addition function and the zero constant value. At block 515, the deduplication logic 420 replaces the original function with the equivalent function identified from the replacement function table 412. Since the constant value has been identified based on its metadata 323, the original load operation for reading the value from the cache 409 is redundant, and is eliminated.

At block 507, if the compression metadata 323 retrieved for the load operation matches the compression metadata associated with a different load operation, the process 500 continues at block 517. At block 517, the redundant address compute unit 311 or 411 calculates one or more duplicate addresses based on which addresses are associated with the compression metadata that matches the compression metadata 323. The duplicate addresses are addresses in the data cache that store the same value as the data cache address of the load operation and are therefore redundant.

Compression metadata values for the C-Pack and BDI compression schemes are compared as previously described with reference to FIGS. 2A and 2B. In alternative embodiments, other compression schemes can be used instead of C-Pack or BDI when their compression metadata values reliably indicate whether the original uncompressed values are equal.

From block 517, the process 500 continues at block 519. In the processing unit 300, the deduplication logic 320 of the load/store queue 308 receives the matching addresses 324 from the redundant address compute unit 311 and eliminates one or more redundant load operations from the queue 308. In one embodiment, the matching addresses 324 are provided by the redundant address compute unit 311 to the deduplication logic 320. The deduplication logic 320 removes any queued load operations from the load/store queue 308 that are redundant due to being directed to a duplicate address. Instead of accessing the cache to perform the removed load operations, the load/store queue 308 uses the data value read from the cache when performing the current load operation, thus eliminating one or more redundant cache accesses.

In an alternative embodiment, the deduplication logic 320 eliminates the cache access for the current load operation by identifying past load operations directed to a duplicate address. That is, the metadata values for the current load address and a previous load address indicate that the addresses store the same value. The current load operation is thus serviced using the data previously retrieved for the matching previous load operation.

Alternatively, in the processing unit 400, the deduplication logic 420 reduces the number of data cache accesses by replacing multiple loads of the same data value with a single load of the data value to a single register. The allocation unit 403 updates the RAT 304 so that multiple register aliases that had been associated with the removed load operations are remapped to the single loaded register. From block 519, the process 500 continues at block 521.

At block 521, the deduplication logic 320 or 420 updates dependencies for any operations originally depending on operations eliminated at blocks 515 or 519. When an original operation is replaced by an equivalent operation, the dependencies of the original operation are updated to depend from the equivalent operation. For example, for an addition operation in which one operand is determined to be zero, the addition operation is replaced with a simpler equivalent operation that outputs the other operand. Accordingly, any operations originally depending on the result of the addition operation are updated to instead depend on the other operand.

When multiple load operations are redundant because they load the same data value and are therefore eliminated at block 519, then any operations dependent on the destination registers of the eliminated load operations are updated to instead depend on the destination register loaded by the remaining load operation.

Eliminating operations can cause other operations to also become redundant; therefore, at block 523, if additional operations (e.g., instructions) are made redundant by the preceding eliminations, the process 500 continues at block 525. At block 525, the additional redundant operations are eliminated in a similar manner as described in blocks 513-515 and 519. Any dependencies on these eliminated operations are updated at block 521. Blocks 521-525 repeat to eliminate redundant operations until at block 523, no more operations are redundant. From block 523, the process 500 continues at block 509 and the load operation is performed.

A method includes, in response to receiving an instruction to perform a first operation on first data stored in a memory device, obtaining first compression metadata from the memory device based on an address for the first data, and reducing a number of operations in a set of operations based on the first operation and one or more matching addresses, the one or more matching address corresponding to second metadata matching the first compression metadata.

In the method, the first compression metadata comprises a first compression code and the second compression metadata comprises a second compression code equal to the first compression code. The reducing the number of operations is performed in response to identifying the first compression code as one of a predetermined subset of compression codes in a set of compression codes for compressing data in the memory device.

In the method, the first compression metadata includes a first delta value representing a difference between the first data and a base value, the second compression metadata comprises a second delta value, and the reducing the number of operations is performed in response to determining that the first delta value is equal to the second delta value and the second delta value is associated with the same base value as the first delta value.

In the method, the memory device is a data cache device. The method also includes generating the first compression metadata when compressing the first data in the data cache device, and generating the second compression metadata when compressing second data in the data cache device.

In the method, the first operation comprises a load operation obtained from a load/store queue of the data cache device, and reducing the number of operations in the set of operations includes eliminating from the load/store queue one or more queued accesses of the data cache device.

The method also includes, in response to determining that the second compression metadata matches the first compression metadata, for each duplicate address of the one or more matching addresses, copying the first data to a register associated with each duplicate address.

The method also includes loading the first data in a physical register and, in response to determining that the second compression metadata matches the first compression metadata, updating dependencies associated with the one or more matching addresses to depend from the loading of the physical register.

The method also includes identifying a constant value corresponding to the second compression metadata, in response to identifying the constant value, replacing the first operation with an equivalent operation based on the first operation and the identified constant value, and updating operation dependencies depending from the first operation to depend from the equivalent operation.

A computing device includes compression logic that, in response to receiving an instruction to perform a first operation on first data stored in a memory device, obtains first compression metadata from the memory device based on an address for the first data. The computing device also includes address compute logic coupled with the compression logic that, in response to identifying second compression metadata that matches the first compression metadata, determines one or more matching addresses corresponding to the second compression metadata. The computing device also includes deduplication logic coupled with the address compute logic that reduces a number of operations in a set of operations based on the first operation and the one or more matching addresses.

In the computing device, the first compression metadata includes a first compression code and the second compression metadata comprises a second compression code equal to the first compression code. The deduplication logic also reduces the number of operations in response to the address compute logic identifying the first compression code as one of a predetermined subset of compression codes in a set of compression codes for compressing data in the memory device.

In the computing device, the first compression metadata includes a first delta value representing a difference between the first data and a base value, and the second compression metadata includes a second delta value. The deduplication logic also reduces the number of operations in response to the address compute logic determining that the first delta value is equal to the second delta value and the second delta value is associated with the same base value as the first delta value.

In the computing device, the memory device includes a data cache device. The compression logic also generates the first compression metadata when compressing the first data in the data cache device, and generates the second compression metadata when compressing second data in the data cache device.

In the computing device, the first operation includes a load operation obtained from a load/store queue of the data cache device, and the deduplication logic also reduces the number of operations in the set of operations by eliminating from the load/store queue one or more queued accesses of the data cache device.

In the computing device, the deduplication logic, for each duplicate address of the one or more matching addresses, copies the first data to a register associated with the duplicate address in response to determining that the second compression metadata matches the first compression metadata.

The computing device also includes a load/store queue coupled with the address compute logic that loads the data in a physical register. The deduplication logic, in response to the address compute logic identifying the second compression metadata that matches the first compression metadata, updates operation dependencies associated with the one or more matching addresses to depend from the loading of the physical register.

In the computing device, the redundant address compute logic identifies a constant value corresponding to the second compression metadata. The deduplication logic also, in response to the identifying the constant value, replaces the first operation with an equivalent operation based on the first operation and the constant value, and updates operation dependencies depending from the first operation to depend from the equivalent operation.

A computing system includes a memory device and a compression engine coupled with the memory device. The compression engine generates first compression metadata for compressing first data for storing in the memory device, and generates second compression metadata for compressing second data for storing in the memory device. The computing system also includes redundant address compute logic coupled with the memory device. The redundant address compute logic, in response to receiving an instruction to perform a first operation on the first data stored in the memory device, obtains the first compression metadata based on an address for the first data, and in response to determining that the second compression metadata matches the first compression metadata, calculates one or more matching addresses for the second data based on the second compression metadata. The computing system includes deduplication logic coupled with the redundant address compute logic that reduces a number of operations in a set of operations based on the first operation and the one or more matching addresses.

In the computing system, the memory device includes a cache memory device, and the first compression metadata and the second compression metadata are stored in the cache memory device.

The computing system also includes a physical register file coupled with the deduplication logic. The deduplication logic reduces the number of operations by reducing a number of register write operations in the physical register file.

The computing system also includes an arithmetic logic unit coupled with the deduplication logic. The deduplication logic reduces the number of operations by reducing a number of computations performed in the arithmetic logic unit.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   in response to receiving an instruction to load first data into a physical register, obtaining first compression metadata from a memory device based on an address for the first data stored in the memory device, the first compression metadata comprising a compressed representation of the first data stored at the address;
   reducing a number of operations of a set of operations in a load/store queue based on the instruction to load the first data into the physical register and one or more addresses of the set of operations, the one or more addresses corresponding to second compression metadata, wherein the second compression metadata comprises a compressed representation of second data, and the second compression metadata matches within a threshold the first compression metadata comprising the compressed representation of the first data; and
   map, based on a register alias table associated with the physical register, the one or more addresses to the physical register.

2. The method of claim 1, wherein:
   the memory device is a data cache device; and
   the method further comprises:
      generating the first compression metadata when compressing the first data in the data cache device, and
      generating the second compression metadata when compressing the second data in the data cache device.

3. The method of claim 2, wherein:
   the instruction to load the first data into the physical register is obtained from the load/store queue of the data cache device; and
   reducing the number of operations in the set of operations comprises eliminating from the load/store queue one or more queued accesses of the data cache device.

4. The method of claim 2, further comprising:
   in response to determining that the second compression metadata matches within the threshold the first compression metadata, for each address of the one or more addresses, copying the first data to a register associated with each address.

5. The method of claim 1, further comprising:
   loading the first data into the physical register; and
   in response to determining that the second compression metadata matches within the threshold the first compression metadata, updating dependencies associated with the one or more addresses to depend from loading the first data into the physical register.

6. The method of claim 1, further comprising:
   identifying a constant value corresponding to the second compression metadata;
   in response to identifying the constant value, replacing an operation of the set of operations in the load/store queue with an equivalent operation based on the first operation and the identified constant value, wherein the operation comprises a computation; and
   updating operation dependencies depending from the operation to depend from the equivalent operation.

7. A computing device, comprising:
   compression logic configured to, in response to receiving an instruction to load first data into a physical register, obtain first compression metadata from a memory device based on an address for the first data stored in the memory device, the first compression metadata comprising a compressed representation of the first data stored at the address;

address compute logic coupled with the compression logic and configured to, in response to identifying second compression metadata, determine one or more addresses corresponding to the second compression metadata, wherein the second compression metadata comprises a compressed representation of second data, and the second compression metadata matches within a threshold the first compression metadata comprising the compressed representation of the first data; and deduplication logic coupled with the address compute logic and configured to:
reduce a number of operations of a set of operations in a load/store queue based on the instruction to load the first data into the physical register and the one or more addresses of the set of operations; and
map, based on a register alias table associated with the physical register, the one or more addresses to the physical register.

8. The computing device of claim 7, wherein:
the first compression metadata comprises a first compression code and the second compression metadata comprises a second compression code equal to the first compression code; and
the deduplication logic is further configured to reduce the number of operations in response to the address compute logic identifying the first compression code as one of a predetermined subset of compression codes in a set of compression codes for compressing data in the memory device.

9. The computing device of claim 7, wherein:
the first compression metadata comprises a first delta value representing a difference between the first data and a base value;
the second compression metadata comprises a second delta value; and
the deduplication logic is further configured to reduce the number of operations in response to the address compute logic determining that the first delta value is equal to the second delta value and the second delta value is associated with a same base value as the first delta value.

10. The computing device of claim 7, wherein:
the memory device comprises a data cache device; and
the compression logic is further configured to:
generate the first compression metadata when compressing the first data in the data cache device, and
generate the second compression metadata when compressing the second data in the data cache device.

11. The computing device of claim 10, wherein:
the instruction to load the first data into the physical register is obtained from the load/store queue of the data cache device; and
the deduplication logic is further configured to reduce the number of operations in the set of operations by eliminating from the load/store queue one or more queued accesses of the data cache device.

12. The computing device of claim 7, wherein the deduplication logic is further configured to:
for each address of the one or more addresses, copy the first data to a register associated with each address in response to determining that the second compression metadata matches within the threshold the first compression metadata.

13. The computing device of claim 7, wherein:
the load/store queue is coupled with the address compute logic and is configured to load the first data into the physical register, and wherein the deduplication logic is configured to:
in response to the address compute logic identifying the second compression metadata that matches within the threshold the first compression metadata, update operation dependencies associated with the one or more addresses to depend from the loading of the physical register; and
further reduce the number of operations of the set of operations in the load/store queue based on one or more operational dependencies of the updated operation dependencies associated with the one or more matching addresses of the set of operations.

14. The computing device of claim 7, wherein:
the address compute logic is further configured to identify a constant value corresponding to the second compression metadata; and
the deduplication logic is further configured to:
in response to identifying the constant value, replace an operation of the set of operations in the load/store queue with an equivalent operation based on the operation and the constant value, and
update operation dependencies depending from the operation to depend from the equivalent operation.

15. A computing system, comprising:
a memory device;
a compression engine coupled with the memory device and configured to:
generate first compression metadata for compressing first data for storing in the memory device, the first compression metadata comprising a compressed representation of the first data stored at an address, and
generate second compression metadata for compressing second data for storing in the memory device, the second compression metadata comprises a compressed representation of the second data, wherein the second compression metadata matches within a threshold the first compression metadata comprising the compressed representation of the first data;
address compute logic coupled with the memory device and configured to:
in response to receiving an instruction to load the first data into a physical register, obtain the first compression metadata based on the address for the first data, and
in response to determining that the second compression metadata matches within the threshold the first compression metadata, calculate one or more addresses for the second data based on the second compression metadata; and
deduplication logic coupled with the address compute logic and configured to:
reduce a number of operations of a set of operations in a load/store queue based on the instruction to load the first data into the physical register and the one or more addresses of the set of operations; and
map, based on a register alias table associated with the physical register, the one or more addresses to the physical register.

16. The computing system of claim 15, wherein:
the memory device comprises a cache memory device; and
the first compression metadata and the second compression metadata are stored in the cache memory device.

17. The computing system of claim 15, further comprising a physical register file coupled with the deduplication logic, wherein the deduplication logic is configured to reduce the number of operations by reducing a number of register write operations in the physical register file.

18. The computing system of claim 15, further comprising an arithmetic logic unit coupled with the deduplication logic, wherein the deduplication logic is configured to reduce the number of operations by reducing a number of computations performed in the arithmetic logic unit.

19. The computing device of claim 7, wherein identifying that the second compression metadata matches within the threshold the first compression metadata comprises identifying that the second compression metadata is equal to the first compression metadata.

20. The computing device of claim 7, wherein to reduce the number of operations of the set of operations, the deduplication logic is configured to, for each address of the one or more addresses, remove a respective load operation of the set of operations from the load/store queue.

\* \* \* \* \*